COMBINATION INFORMATION GUIDE AND INDEXED NOTE BOOK FOR WALL TELEPHONES

Filed Aug. 25, 1961

Irving M. Bissonnette
Yolanda J. Bissonnette
Harold F. Bissonnette
INVENTORS.

BY Clarence A. O'Brien
and Harvey B. Jacobson
Attorneys

United States Patent Office 3,085,134
Patented Apr. 9, 1963

3,085,134

COMBINATION INFORMATION GUIDE AND INDEXED NOTE BOOK FOR WALL TELEPHONES

Irving M. Bissonnette, Yolanda J. Bissonnette, and Harold F. Bissonnette, all of 4311 Narragansett, Chicago, Ill.
Filed Aug. 25, 1961, Ser. No. 133,820
7 Claims. (Cl. 179—146)

This invention relates to new and useful improvements in accessories or attachments for telephone instruments, and the principal object of the invention is to provide the user of a telephone instrument with readily and conveniently available facilities for writing notes, ascertaining various types of information relative to the town or city where the instrument is located, finding telephone numbers to be dialed, and also for temporarily supporting the usual hand set of the instrument "off the hook" when the user finds it necessary to do so.

Specifically, the accessory or attachment in accordance with the invention is intended for use with wall-mounted telephones having a substantially rectangular wall-mounted base or housing, and an important feature of the invention resides in the provision of means in the form of an elastic web or band, for perimetrically embracing the wall-mounted housing and removably securing the attachment thereto. The attachment also includes a plate-shaped carrier which is held juxtaposed to the telephone instrument housing by the aforementioned elastic web, and another important feature of the invention resides in the particular structural arrangement of the carrier which renders the same readily applicable to the instrument housing for support thereon. A still further feature of the invention resides in the provision of a loose-leaf book on the aforementioned carrier, such a book containing pages with desirable information thereon as well as note paper or blank pages, all of which may be removed from the book when the information is to be changed and/or when the blank pages are filled with notes. Another feature of the invention resides in the provision of a cradle on the carrier for temporarily supporting the usual telephone hand set, when so desired.

Some of the advantages of the invention lie in its simplicity of construction, convenient and dependable operation, in its pleasing appearance, and in its adaptability to convenient and economical manufacture.

With the foregoing more important objects and features in view and such other objects and features as may become apparent as this specification proceeds, the invention will be understood from the following description taken in conjunction with the accompanying drawings, wherein like characters of reference are used to designate like parts, and wherein.

Figure 1:
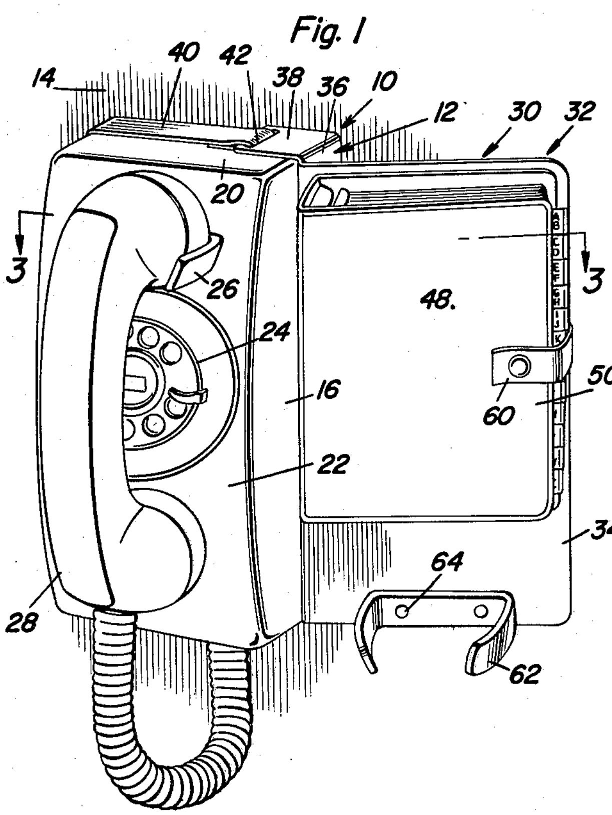
FIGURE 1 is a perspective view of a wall-mounted telephone instrument with the attachment of the invention applied thereto.
Figure 2:
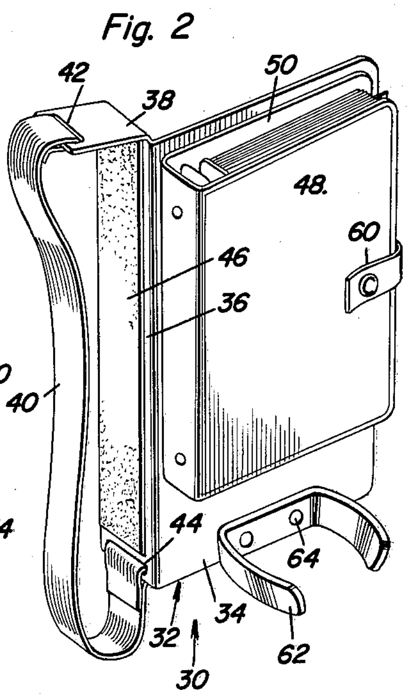
FIGURE 2 is a perspective view of the attachment per se.

Referring now to the accompanying drawings in detail, the numeral 10 designates a conventional telephone instrument having a base or housing 12 mounted upon a vertical wall 14. The housing 12 is substantially rectangular and vertically elongated, having a pair of side edges 16, 18, an upper edge 20, a lower edge (not illustrated) and a front 22 equipped with the usual dial 24 and a hook 26 for the usual hand set 28.

The attachment or accessory in accordance with the invention is designated generally by the reference numeral

30 and embodies a carrier 32 which consists of a flat, vertically disposed and elongated panel 34, provided at one side edge thereof with a flange 36 which, in turn, is equipped at its upper end with a horizontal, laterally outwardly projecting tab 38.

The carrier 32 is juxtaposed to the housing 12 of the instrument 10, with the flange 36 of the carrier abutting the side edge 16 of the housing and the tab 38 overlying and resting on the top edge 20 of the housing, whereby to prevent downward sliding of the carrier relative to the housing, as will be clearly apparent.

The carrier 32 is secured to the housing 12 by an elastic band or web 40 which has one end thereof suitably anchored in a slot 42 in the tab 38, while the other end of the web is similarly anchored in a slot 44 in the lower end of the flange 36.

The elastic web 40 perimetrically embraces the housing 12 by extending over the upper edge 20, along the side edge 18 and under the lower edge (not illustrated) of the housing, and by frictionally engaging and embracing the same, the web firmly retains the carrier 32 in position. Nevertheless, the attachment may be easily removed from the telephone instrument, when so desired. A lining strip 46 of felt, rubber, or other suitable material is provided on the face of the flange 36 in abutment with the housing side wall or edge 16 to prevent scratching of the same, and if desired, such a lining strip may be extended to cover the underside of the tab 38, for the same purpose.

A loose-leaf book 48 is mounted on the panel 34 of the carrier 32 and includes a loose-leaf binder 50 which is rigidly secured to the panel by suitable fasteners 52 such as bolts or rivets. The book binder 50 contains a section of individually replaceable leaves 54 which may be in the form of a telephone directory, arranged in alphabetical order and containing names, addresses and telephone numbers of frequently called parties. The leaf section 54 may be at the back of the book, while the front of the book contains a leaf section 56 with information thereon relative to airports, railroad facilities, parking facilities, street guides, recreation facilities and similar other data pertaining to the particular environment of the town or city in which the telephone instrument is located. In between the leaf sections 54 and 56 may be a section 58 of blank pages on which notes may be made by the telephone user. It is to be observed that the loose-leaf arrangement of the book 48 permits the various leaves in the sections 54, 56, 58 to be individually removed and replaced by others, as necessary. The binder 50 of the book 48 may be held closed by a suitable fastener means 60, as will be clearly understood.

A curved strap 62 is secured by suitable fastening elements 64 to the panel 34 below the book 48 and forms a cradle for supporting the hand set 28 of the telephone instrument when the user finds it necessary to temporarily leave the telephone for some purpose, it being noted that the cradle forming strap 62 is so positioned on the panel 34 that the placing of the hand set therein does not interfere with opening and closing of the book 48.

Figure 3:
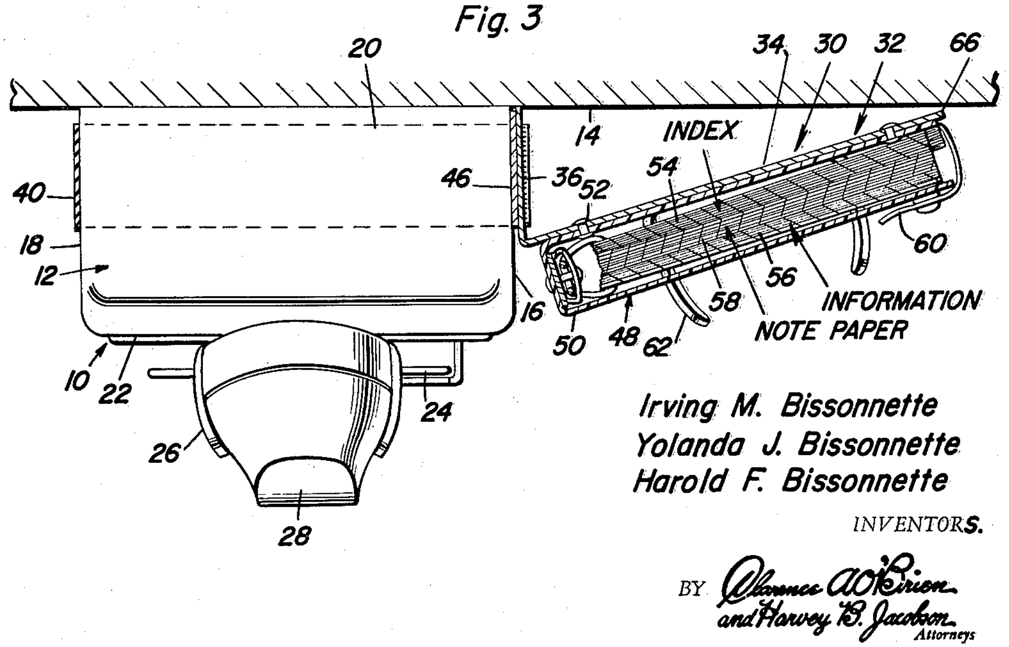
FIGURE 3 is a horizontal sectional view, taken substantially in the plane of the line 3—3 in FIGURE 1 but with the telephone instrument shown in top plan.

The flange 36 is preferably offset from the panel 34 by an acute angle, best shown in FIGURE 3, so that the panel 34 is offset by an acute angle from the wall 14 on which the instrument 10 is mounted, this offset facilitating convenient access to both the telephone and the book 48 and also permitting the free outer side edge 66 of the panel 34 to contact the wall 14 for purposes of additional support, particularly when pressure by a writing instrument is applied to the pages of the book on the panel.

While in the foregoing there has been shown and described the preferred embodiment of the invention, various modifications may become apparent to those skilled in the art to which the invention relates. Accordingly, it is not desired to limit the invention to this disclosure and various modifications and equivalents may be resorted to, falling within the spirit and scope of the invention as claimed:

What is claimed as new is:

1. The combination of a wall-mounted telephone instrument including a substantially rectangular wall-mounted housing having a pair of side edges and upper and lower end edges, a carrier juxtaposed to said housing and including a substantially vertical panel, a flange provided at one side edge of said panel and abutting one side edge of the housing, and a horizontally angulated tab projecting laterally outwardly from the upper end of said flange and overlying the upper edge of said housing, an elastic web connected at one end thereof to said tab and at its other end to the lower end of said flange, said web extending perimetrically of the upper and lower edges of the housing and of the side edge of the housing opposite from that having said flange in abutment therewith whereby to frictionally engage the housing and removably secure said carrier thereto, and a note paper and information containing book mounted on said panel of said carrier.

2. The combination as defined in claim 1 wherein said book includes a loose-leaf binder secured to said panel.

3. The combination as defined in claim 1 wherein said flange is offset by an acute angle from the plane of said panel whereby to support the panel at an acute angle to the plane of a wall having said housing mounted thereon.

4. The combination as defined in claim 1 wherein said instrument also includes a removable hand set, and a hand set supporting cradle provided on said panel below said book.

5. An attachment for the housing of a wall-mounted telephone instrument, said attachment comprising a panel adapted to be juxtaposed to a wall-mounted telephone instrument housing, a flange provided on one side edge of said panel for abutment with one side edge of the stated housing, a laterally outwardly angulated tab provided on the upper end of said flange for overlying an upper edge of the stated housing, and an elastic web adapted to perimetrically embrace the stated housing, one end of said web being connected to said tab and its other end being connected to the lower end of said flange.

6. The attachment as defined in claim 5 wherein said flange is offset by an acute angle from the plane of said panel whereby to support the panel at an acute angle to the plane of a wall having said housing mounted thereon.

7. The attachment as defined in claim 6 including a note paper and information containing book mounted on said panel.

References Cited in the file of this patent

UNITED STATES PATENTS

| | | |
|---|---|---|
| 2,567,449 | Sherman | Sept. 11, 1951 |
| 2,987,585 | Abysalh | June 6, 1961 |